United States Patent
Spedden et al.

[15] 3,661,563
[45] May 9, 1972

[54] CYCLIC LEACH-PRECIPITATION PROCESS FOR RECOVERING COPPER VALUES FROM BODIES OF ORE MATERIAL CONTAINING COPPER MINERALS

[72] Inventors: Henry Rush Spedden; Emil Edward Malouf, both of Salt Lake City, Utah

[73] Assignee: Kennecott Copper Corporation, New York, N.Y.

[22] Filed: July 16, 1970

[21] Appl. No.: 55,578

[52] U.S. Cl. ..............................75/101 R, 75/104, 75/109, 75/117
[51] Int. Cl. .......................................................C22b 15/12
[58] Field of Search........................75/117, 104, 109, 101 R

[56] References Cited

UNITED STATES PATENTS

| 3,109,732 | 11/1963 | Goren | 75/101 |
|---|---|---|---|
| 3,117,000 | 1/1964 | Schlain et al. | 75/109 |
| 3,260,593 | 7/1966 | Zimmerley et al. | 75/117 |

Primary Examiner—L. Dewayne Rutledge
Assistant Examiner—G. T. Ozaki
Attorney—John L. Sniado, Mallinckrodt and Cornaby and Philip A. Mallinckrodt

[57] ABSTRACT

As part of a cyclic, copper leaching-precipitation process, an aqueous solution containing reducing ions selected from the group consisting of sulfite ion and bisulfite ion is injected into a body of copper ore material at a location or locations adjacent the emergence from such body of an applied acidic leach solution containing ferric ions and pregnant with copper values, for reducing ferric ions in such leach solution to ferrous ions so consumption of metallic iron in the precipitation stage is minimized. The injection site or sites are removed from access of atmospheric air, and injection is carried out in the absence of oxygen to prevent auto-oxidation of the reducing agent. Such agent acts as a bacteriacide to eliminate anaerobic, hydrogenase-producing strains of bacteria normally present, which bacteria would otherwise reduce sulfates and produce hydrogen sulfide to thereby effect precipitation of soluble copper into insoluble copper sulfide. Additionally, the reducing agent inhibits the action of autotrophic aerobic bacteria normally present in areas penetrated by atmospheric air and thereby minimizes oxidation of ferrous ions to ferric.

8 Claims, No Drawings 3,661,563

CYCLIC LEACH-PRECIPITATION PROCESS FOR RECOVERING COPPER VALUES FROM BODIES OF ORE MATERIAL CONTAINING COPPER MINERALS

BACKGROUND OF THE INVENTION

1. Field

The invention is in the field of hydrometallurgical processing of ore materials containing copper minerals and is particularly related to cyclic leaching processes applied to pervious bodies of such ore materials, e.g., dumps of mine waste, heaps of previously mined ore, mill tailings, etc., and broken or otherwise permeable bodies of ore in situ, wherein the dissolved copper in the pregnant leach solution is recovered by precipitation on metallic iron and the depleted solution is recycled through such body of ore materials. More specifically, the invention is concerned with elimination of ferric ions from the pregnant leach solution prior to the copper precipitation stage of the overall process.

2. State of the Art

Hydrometallurgical processes of the general type concerned are well known and widely used for the recovery of copper values from mine waste dumps of ore materials too low in grade to warrant processing by the usual milling procedures. Ferric ions are necessary in the acidic leach solution to dissolve copper sulfide mineral values present in the waste ore materials being leached. However, any carry-over of ferric ions in the pregnant leach solution or formation of ferric ions in such solution after it reaches collection channels beneath the dumps is detrimental to the copper precipitation or cementation step, in that such ferric ions wastefully consume the metallic iron precipitant and compete with the copper ions therefor. Even where only copper oxide minerals are present in the ore materials, iron values are normally leached from such materials concurrently with the copper values and inevitably result in the presence of ferric ions in the pregnant leach solution to the detriment of the precipitation stage of the process.

There are various ways presently known of eliminating ferric ions from the pregnant leach solution. Thus, as disclosed in our copending application Ser. No. 823,695 May 12, 1969 entitled "Improved Process for Precipitating Copper from Solution," the pregnant leach solution which flows from the dump is contacted with sulfur dioxide under conditions of vigorous agitation. Again, as disclosed in the copending application of Henry R. Spedden, John A. Apps, and Donald F. Lowe, Ser. No. 28,874 Apr. 15, 1970 and entitled "Reduction of Ferric Ions in Cyclic Process of Leaching and Precipitation of Copper," a controlled quantity of a reductant of the type here utilized is added to the pregnant leach solution which flows from the dump and the resulting solution is brought into contact with an activated carbon catalyst for a controlled period of time.

SUMMARY OF THE INVENTION

In accordance with the present invention, the reductant (an aqueous solution containing reducing ions selected from the group consisting of sulfite ion and bisulfite ion) is injected directly into the dump or other body of ore material being leached at a location or locations adjacent the emergence of the pregnant leach solution, so as to flow into such leach solution and mix therewith in the absence of atmospheric air or other oxygen. We have found that even with a relatively short emergence time for the solution following the injection, e.g., an hour, ferric ions are largely eliminated therefrom. Moreover, based on tests in dump leaching according to the invention, it has been found that the reductant acts as a bacteriacide with respect to anaerobic, hydrogenase-producing strains of bacteria normally present in the interior of the dump at locations free from the penetration of atmospheric air. This is a decided advantage, since such bacteria reduce sulfates in the pregnant leach solution and also generate hydrogen sulfide, which acts to precipitate soluble copper into insoluble copper sulfide. Additionally, we have found also that the reductant inhibits activity of autotrophic aerobic bacteria in areas near the toe of the dump that are penetrated by atmospheric air and thereby minimizes oxidation of ferrous ions back to the ferric state.

The reductant is conveniently injected through a bore hole or holes drilled into the body of ore materials at an appropriate surface location or locations.

DETAILED DESCRIPTION OF PREFERRED PROCEDURE

The best mode presently contemplated of carrying out the invention is the use of an aqueous reductant solution of sulfur oxide (sulfurous acid) or of sodium or ammonium bisulfite and the injection of such a solution into the waste dump or other body of ore material near the point or points of emergence of pregnant leach therefrom but sufficiently far into the body to avoid atmospheric air penetration.

The reductant solution is preferably injected through a bore hole or holes extending from the surface to the location or locations of utilization in the body of ore materials concerned in order to eliminate anaerobic, hydrogenase-producing strains of bacteria active in areas of such body not penetrated by atmospheric air. The reductant solution is preferably introduced so as to mix with the leach solution in such areas. Thus, in addition to eliminating ferric ions from the pregnant leach solution in such areas, there is the added advantage of preventing the reduction of sulfates and formation of hydrogen sulfide with consequent conversion of soluble copper to copper sulfide.

Large scale field tests made on a waste dump of a large copper mine has shown the effectiveness of the process of the invention. In a first test, a quantity of 100 tons of aqueous ammonium bisulfite solution was used as the reductant. It contained the equivalent of 30 tons of sulfur oxide and, stoichiometrically, could reduce 105,000 pounds of ferric iron. The reductant solution was injected through a bore hole extending 200 feet down from the surface of the dump directly over but 80 feet short of reaching the underground stream channel into which all the leach solution applied to the top of the dump seeped for flow from the dump. The reaction zone below the injection location was tested and found to be free of air. The horizontal distance from such reaction zone to the toe of the dump was approximately 750 feet.

The results of this test showed that 90,956 pounds of ferric iron were reduced over a 21-hour period and that the efficiency of conversion was 86.6 percent. An additional 7,400 pounds of copper were recovered during the 21-hour period of the test over and above the amount that had been recovered by ordinary leaching techniques carried out during the previous 7 days. The concentration of copper in the pregnant leach solution reached a peak of 13.9 pounds per 1,000 gallons, as contrasted to 9.5 pounds during normal leaching procedures. Moreover, the acidity of the effluent pregnant leach solution increased to a pH of 2.2 from a pH of 2.3 for effluent pregnant solution during the usual leaching procedures.

In a second test carried out approximately a month later on the same dump utilizing the same bore hole, a second quantity of 100 tons of aqueous ammonium bisulfite solution was injected. This reductant solution contained the equivalent of 36.5 tons of sulfur dioxide and was injected into the bore hole at intervals over a period of several days. An initial quantity of 2,250 gallons was injected over a period of 1 ½ hours the morning of the first day; 24 hours later, a total 3,200 gallons of the reductant solution was injected over a period of an hour and a quarter; 48 hours later, an additional quantity of 3,600 gallons was injected over a period of 2 hours. On the last day, 72 hours later, the remaining 9,000 gallons of the reductant solution was injected over a period of 3 hours. The results of this second test in terms of effluent solution over a period of 13 days immediately following and including the final day of injecting the reductant solution are shown in Table II. For comparative purposes Table I shows the results of normal leaching practices in terms of effluent solution for the 16-day period immediately preceding this second test of the invention and including the first 3 days of injection of the reductant solution.

TABLE I.—NORMAL PRACTICE

| Time, day | Flow, g.p.d. | Pounds/1,000 gallons | | | |
|---|---|---|---|---|---|
| | | Copper | Iron total | Ferrous | Ferric |
| 1st | 12,055,680 | 5.0 | 23.4 | 3.8 | 19.6 |
| 2nd | 11,376,000 | 4.6 | 20.9 | 1.3 | 19.6 |
| 3rd | 11,079,360 | 4.2 | 20.0 | 1.7 | 18.3 |
| 4th | 12,055,680 | 4.4 | 20.9 | 1.3 | 19.6 |
| 5th | (1) | 4.4 | 21.1 | .8 | 20.3 |
| 6th | 9,849,600 | 4.4 | 20.9 | 1.3 | 19.6 |
| 7th | 9,921,600 | 4.3 | 18.7 | .8 | 17.9 |
| 8th | 9,504,000 | 5.8 | 20.8 | 1.7 | 19.1 |
| 9th | 9,144,000 | 3.8 | 18.8 | .8 | 18.0 |
| 10th | 10,454,000 | 4.3 | 20.2 | .4 | 19.8 |
| 11th | 10,454,000 | 3.9 | 18.8 | .8 | 18.0 |
| 12th | 10,454,000 | 4.2 | 20.4 | 3.8 | 16.6 |
| 13th | 9,511,200 | 3.8 | 20.9 | 1.6 | 19.3 |
| 14th | 7,709,000 | 3.8 | 15.0 | 1.7 | 13.3 |
| 15th | 7,709,000 | 3.8 | 18.6 | .8 | 17.8 |
| 16th | 7,709,000 | 3.9 | 17.4 | 1.7 | 15.7 |
| Arith. avg | 9,932,200 | 4.3 | 19.8 | 1.5 | 18.3 |

[1] Not available.

TABLE II.—PRACTICE OF THE INVENTION

| Time, day | Flow, g.p.d. | Pounds/1,000 gallons | | | |
|---|---|---|---|---|---|
| | | Copper | Iron total | Ferrous | Ferric |
| 17th | 8,596,000 | 4.7 | 17.7 | 15.4 | 2.3 |
| 18th | 9,136,800 | 4.8 | 20.0 | 4.8 | 15.2 |
| 19th | 12,391,200 | 5.3 | 21.5 | 7.5 | 14.4 |
| 20th | 10,111,680 | 5.6 | 20.4 | 7.5 | 12.9 |
| 21st | 8,589,600 | 6.2 | 21.7 | 3.3 | 18.4 |
| 22nd | 7,997,760 | 6.3 | 19.8 | 2.9 | 16.9 |
| 23rd | 7,997,760 | 6.3 | 23.0 | 5.8 | 17.2 |
| 24th | 8,589,600 | 5.9 | 22.6 | 5.8 | 16.1 |
| 25th | 9,158,400 | 6.8 | 23.0 | 6.7 | 16.3 |
| 26th | 7,433,280 | 6.9 | 21.7 | 5.8 | 15.9 |
| 27th | 10,111,680 | 6.1 | 19.2 | 0.4 | 18.8 |
| 28th | (1) | 6.3 | 20.4 | 5.8 | 14.6 |
| 29th | (1) | 6.3 | 21.4 | 5.8 | 15.6 |
| Arith. avg | 9,101,250 | 5.9 | 20.9 | 5.9 | 14.9 |

[1] Not available.

NOTE.—pH of solution 2.2 as against normal 2.3.

It should be realized that although the foregoing tests were carried out under conditions not capable of the close control normally possible under laboratory conditions, the results are clearly indicative of the successful accomplishment of the objectives of the invention in terms of minimizing ferric iron content of the effluent pregnant solution, of increasing its copper content, and of increasing its acidity over normal practice.

We claim:

1. In a cyclic process for the leaching and recovering of copper values from copper minerals in a pervious body of copper ore materials, wherein an acidic leach solution containing ferric ions is passed through said body and the resulting solution, pregnant with copper values, is brought into contact with metallic iron for the precipitation of copper prior to recycling of the solution through said body, the improvement comprising injecting into the pregnant leach solution as it is about to emerge from the said body of ore material an aqueous reductant solution containing reducing ions selected from the group consisting of sulfite ion and bisulfite ion, for converting ferric ions to ferrous ions so as to significantly reduce the quantity of ferric ions in said solution and for inhibiting bacterial action.

2. The improved process of claim 1, wherein the aqueous reductant solution is injected into the body of ore materials sufficiently deeply therein as to mix with the pregnant leach solution substantially in the absence of atmospheric air.

3. The improved process of claim 2, wherein the aqueous reductant solution is ammonium bisulfite.

4. The improved process of claim 2, wherein the aqueous reductant solution is sodium bisulfite.

5. The improved process of claim 2, wherein the aqueous reductant solution is sulfurous acid.

6. The improved process of claim 1, wherein the aqueous reductant solution is ammonium bisulfite.

7. The improved process of claim 1, wherein the aqueous reductant solution is sodium bisulfite.

8. The improved process of claim 1, wherein the aqueous reductant solution is sulfurous acid.

* * * * *